US008254624B2

(12) United States Patent
Seely

(10) Patent No.: US 8,254,624 B2
(45) Date of Patent: *Aug. 28, 2012

(54) ARCHITECTURE FOR EXPORTING DIGITAL IMAGES

(75) Inventor: Blake R. Seely, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,920

(22) Filed: Jul. 4, 2011

(65) Prior Publication Data

US 2011/0262040 A1    Oct. 27, 2011

Related U.S. Application Data

(63) Continuation of application No. 11/706,705, filed on Feb. 14, 2007, now Pat. No. 7,974,486.

(51) Int. Cl.
*G06K 9/00* (2006.01)

(52) U.S. Cl. ........................................ 382/100

(58) Field of Classification Search .................. 382/100, 382/276

See application file for complete search history.

(56) References Cited

U.S. PATENT DOCUMENTS 5,828,485 A    10/1998  Hewlett

OTHER PUBLICATIONS

Jennifer Fulton and Scott M. Fulton II, Sams teach yourself Adobe Photoshop elements 3 in a snap, Sams Publishing, First printing Dec. 2004, pp. 5, 182, 189, 194, 204, 210, 263, 588, 589, 591.*
Fulton, J. et al., "Sams teach yourself Adobe Photoshop elements 3 in a Snap" Sams Publishing, First printing, Dec. 2004, pp. 5, 182, 189, 194, 204, 210, 263, 588, 589 and 591.

* cited by examiner

*Primary Examiner* — Claire X Wang
(74) *Attorney, Agent, or Firm* — Hickman Palermo Truong Becker Bingham Wong LLP; Daniel D. Ledesma

(57) ABSTRACT

A method and apparatus for allowing applications to access edited image data from an image editing application are disclosed herein. When the user desires to export edited images, the user causes the image editing application to display a plug-in user interface (UI). The plug-in UI may allow the user to enter exporting parameters, although this is not required. After the user selects an "export" button in the plug-in UI, the image editing application confirms with the plug-in on an image-by-image basis which of the images should be exported. The image editing application then generates an export version of the image. If necessary, the image editing application applies image adjustments to the master image to generate the export version. The image editing application then makes the export version available to the plug-in.

22 Claims, 6 Drawing Sheets

ARCHITECTURE FOR EXPORTING DIGITAL IMAGES

RELATED APPLICATIONS

This application claims the benefit as a Continuation of U.S. patent application Ser. No. 11/706,705, filed Feb. 14, 2007 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application; which claims benefit of U.S. Provisional Application Ser. No. 60/846,830, filed Sep. 22, 2006, entitled "ARCHITECTURE FOR IMAGE MANIPULATION," by Bhatt et al., the entire contents of which are incorporated by reference as if fully set forth herein.

FIELD OF THE INVENTION

The present invention relates to digital image editing. In particular, an embodiment of the present invention relates to a plug-in architecture that allows an image editing application to export versions without a user leaving the image editing application.

BACKGROUND

Digital image editing applications allow users to manage and manipulate digital images that the user chooses to import into the image editing application. For example, a user can import digital photographs from a camera, card reader, or storage medium into the image editing application. Then, the user can edit the photograph in some manner. Some examples of editing are removing red-eye, adjusting color, brightness, contrast, filtering noise etc. Other examples of editing are cropping or rotating a photograph. A user can also edit a photograph by adding annotations, such as rating the photograph or other comments.

After a user finishes editing the digital images, the user may wish to transfer a copy of the image to another application. For example, the user may wish to store a copy of an edited photograph to a website. However, transferring the copy of the photograph presents problems. One such problem is that the other application may have specific formatting and settings that must be complied with. For example, a stock photography service or photograph print lab may require that photographs be transferred to them at a specific pixel size, a specific file format, or with particular types of metadata.

One technique of allowing a user to export versions from an image editing application requires the user to switch between the image editing application and the application to which the image is to be exported. For example, first the user may need to export the image to a storage medium, such as a disk drive. Then, the user opens the other application, which accesses the image from the disk drive. Finally, the other application, works with the export version. For example, the other application might upload the image to a web site. However, this technique may require the user to perform tedious operations such as "dragging and dropping" one or more icons representing the file(s) that stores the image(s).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
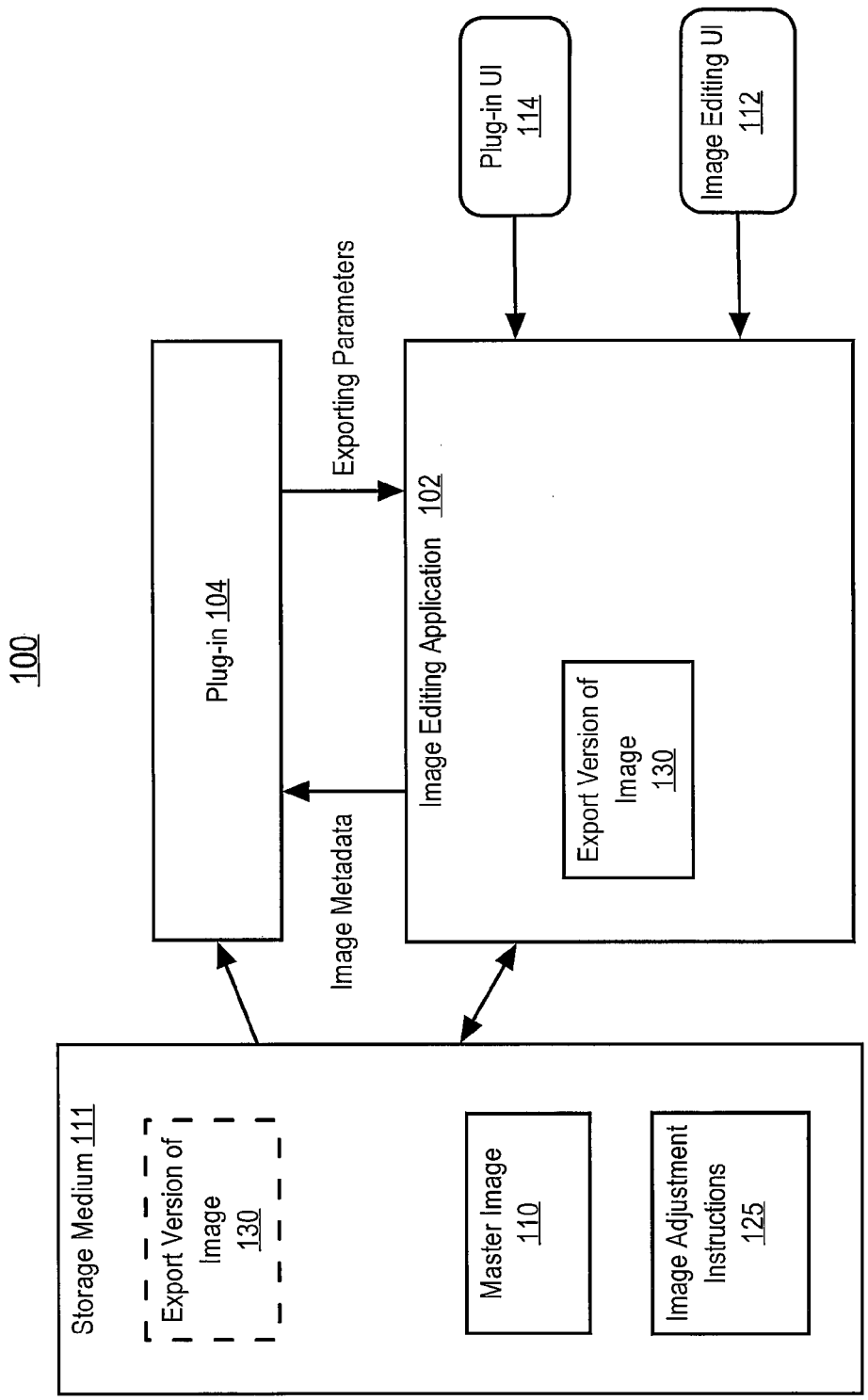
FIG. 1 shows an example system that includes an image editing application and plug-in, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques that allow other applications to access edited image data from an image editing application without a user exiting the image editing application are disclosed herein. In one embodiment, the image editing application has an interface that allows plug-ins from the other applications to access edited image data without the user exiting the image editing application. Examples of other applications are a stock photography service or photograph print lab.

The image editing application allows the user to make image adjustments to a master version of an image, in one embodiment. In one embodiment, the master image itself is not altered. Rather, the image editing application generates an adjusted version of the master image, based on user input. Examples of image adjustments include changes in contrast, hue, color, etc. Other image adjustments include cropping or rotating. The image adjustments the user made to the master image are saved as a set of image adjustment instructions. Therefore, these image adjustment instructions can be applied at any time to the master image to re-generate the adjusted version in accordance with the user's adjustments.

When the user desires to export one or more edited images to a different application, such as a stock photography service or photograph print lab, the user causes the image editing application to display a plug-in user interface (UI). The plug-in UI corresponds to the application to which the image is to be exported, in one embodiment. For example, the plug-in UI is specifically configured for a photograph print lab application. The plug-in UI may allow the user to enter exporting parameters, although this is not required. Examples of exporting parameters are the image format (e.g., JPEG, TIFF), desired location to store the export version(s) and image size (e.g., x by y pixels). Alternatively, the plug-in itself can determine suitable exporting parameters.

After the user selects an "export" button in the plug-in UI, the image editing application confirms with the plug-in on an image-by-image basis which of the images should be exported. Note that the image that is exported can be the master image or an adjusted version. That is, the image adjustments may or may not be applied to the master image to generate the export version of the master image. However, whatever exporting parameters are required by the plug-in are applied. For example, the export version could be formatted by the image editing application as a JPEG format image of a specified image size.

The image editing application then generates an export version of the image. If necessary, the image editing application applies image adjustments to the master image to generate the export version. The image editing application then makes the export version available to the plug-in. The plug-in then processes the export version as desired, such as uploading the export version to a website that provides a stock photograph service.

Example System

FIG. 1 shows an example system 100 that includes an image editing application 102 and plug-in 104, in accordance with an embodiment of the present invention. The image editing application 102 is an application that is able to manipulate and manage digital image data. Image editing applications 102 are able to perform a variety of features including, but not limited to, color adjustments, changing contrast and brightness, image re-sizing, image cropping, rotating images, noise removal, removal of elements, removing red eye, selective color changes, and merging images. Herein the term "adjustments" is used to refer to edits to a digital image. The term adjustments includes the aforementioned features, but is not limited to these features.

An example of digital image data is photographs; however, the image data is not limited to photographs. An example of an image editing application 102 is Aperture, which is commercially available from Apple Computer, Inc. of Cupertino, Calif. In general, export versions of digital images are exported from the image editing application 102 by making the export versions available to the plug-in 104. A user does not need to leave the image editing application 102 to export the edited images.

The storage medium 111 has stored thereon a master image 110. The master image 110 is any digital image. The master image 110 may be a photograph, although that is not required.

The master image 110 may have been received directly from an electronic device such as a digital camera. However, an intermediate device, such as a card reader, may be used to transfer the master image 110 from a digital camera. However, it is not required that the master image 110 originate from an electronic device, such as a digital camera. For example, it is possible that the master image 110 was created by a software application and stored to the storage medium 111.

The user may apply adjustments to the master image 110. In one embodiment, the image editing application 102 is non-destructive. By non-destructive it is meant that the master image 110 is not destroyed by the editing process. Rather, the image editing application 102 stores image adjustment instructions 125, which are instructions that describe the adjustments made to the master image 110. Thus, at any time the image adjustment instructions 125 may be applied to the master image 110 to generate an adjusted version. It is not required that the adjusted version be stored on the storage medium 111. For example, the adjusted version might exist temporarily in main memory.

The plug-in 104 is a component to which export versions of images are exported. The image editing application 102 may have access to many such plug-ins 104, with each plug-in corresponding to a specific use. For example, one plug-in 104 might be for a stock photograph service, while another plug-in for a photo lab. As an example, a plug-in 104 might be provided by the entity that provides the stock photograph service; however, any entity may provide the plug-in 104. Each plug-in 104 is able to perform appropriate processing of the export versions, such as uploading the export versions to a stock photograph website. The plug-in UI 114 allows a user to enter parameters that are used to control exporting the export version to the plug-in 104.

The image editing application 102 provides image metadata to the plug-in 104. Examples of image metadata include, but are not limited to, keywords, date a photograph was taken, where a photograph was taken, image format (e.g., JPEG, TIFF, etc.). The image metadata may be used by the plug-in 104 to determine whether an image that is a candidate for export should be exported. The image metadata can be edited by the user via the plug-in UI 114, in one embodiment.

The plug-in 104 provides the image editing application 102 with exporting parameters. The exporting parameters include any information to make the export version 130 compatible with requirements of an application for which the image is to be used. Examples of exporting parameters include, but are not limited to, image format (e.g., JPEG, TIFF), image size (e.g., x pixels by y pixels), image metadata requirements. For example, if a stock photography service requires that images be in a JPEG format, the plug-in 104 for the stock photography service instructs the image editing application 102 to export the images in a JPEG format.

The export version 130 is based on whatever exporting parameters the plug-in 104 desires. However, the export version 130 may or may not include image adjustments. That is, the image adjustment instructions 125 do not have to be applied to the master image 110. The image editing application 102 generates the export version 130 of the master image based on input from the plug-in UI 114 and/or the image editing UI 112. Storing the export version 130 to the storage medium 111 is optional (export version 130 is illustrated with a dashed box to indicate that its storage is optional).

Overview of Process Flow

Figure 2:
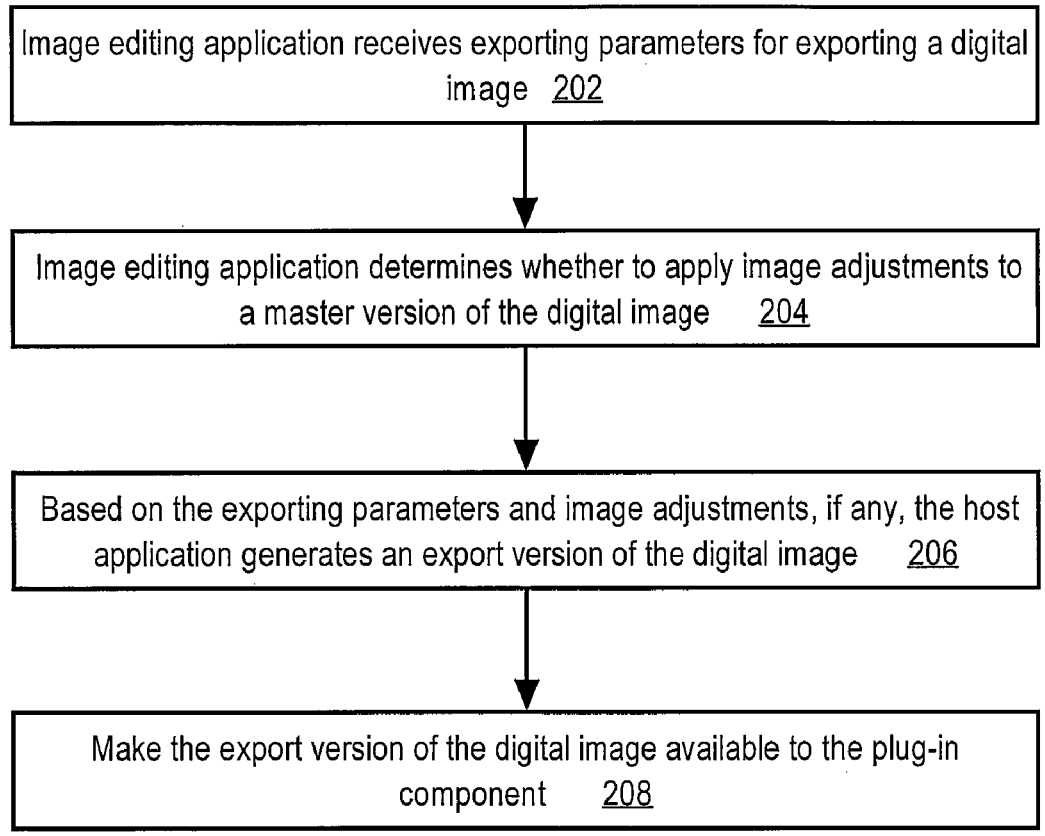
FIG. 2 illustrates a process of exporting edited images from an image editing application, in accordance with an embodiment of the present invention.

FIG. 2 illustrates a process 200 of exporting images from an image editing application 102, in accordance with an embodiment of the present invention. Process 200 will be discussed in connection with the system 100 of FIG. 1; however, process 200 is not so limited. In step 202, the image editing application 102 receives, from the plug-in 104, exporting parameters for rendering a digital image. As an example, the plug-in 104 informs the image editing application 102 that the export version 130 should be in a JPEG format having 640×640 pixels.

In step 204, the image editing application 102 determines whether to apply image adjustments to a master version 110 of the digital image. For example, the image editing application 102 determines whether there are any image adjustment instructions 125 associated with the master image 110. Further, the image editing application 102 may determine whether or not the image adjustment instructions 125 should be applied even if such instructions 125 exist.

Based on the exporting parameters and image adjustment instructions 125, if any, the image editing application 102 generates an export version 130 of the digital image, in step 206. In one embodiment, the image editing application 102 applies the image adjustment instructions 125 to the master image 110 after a request to export the image has been received. In another embodiment, the image adjustment instructions 125 are applied to the master image 110 prior to the request to export the image.

In step 208, the export version 130 of the digital image is made available to the plug-in 104. The export version 130 can be stored to the storage medium 111 to make it available to the plug-in 104. Alternatively, the export version 130 can be made accessible to the plug-in 104 without storing the export version 130 to the storage medium 111.

Example Plug-In User Interfaces

Figure 3A:
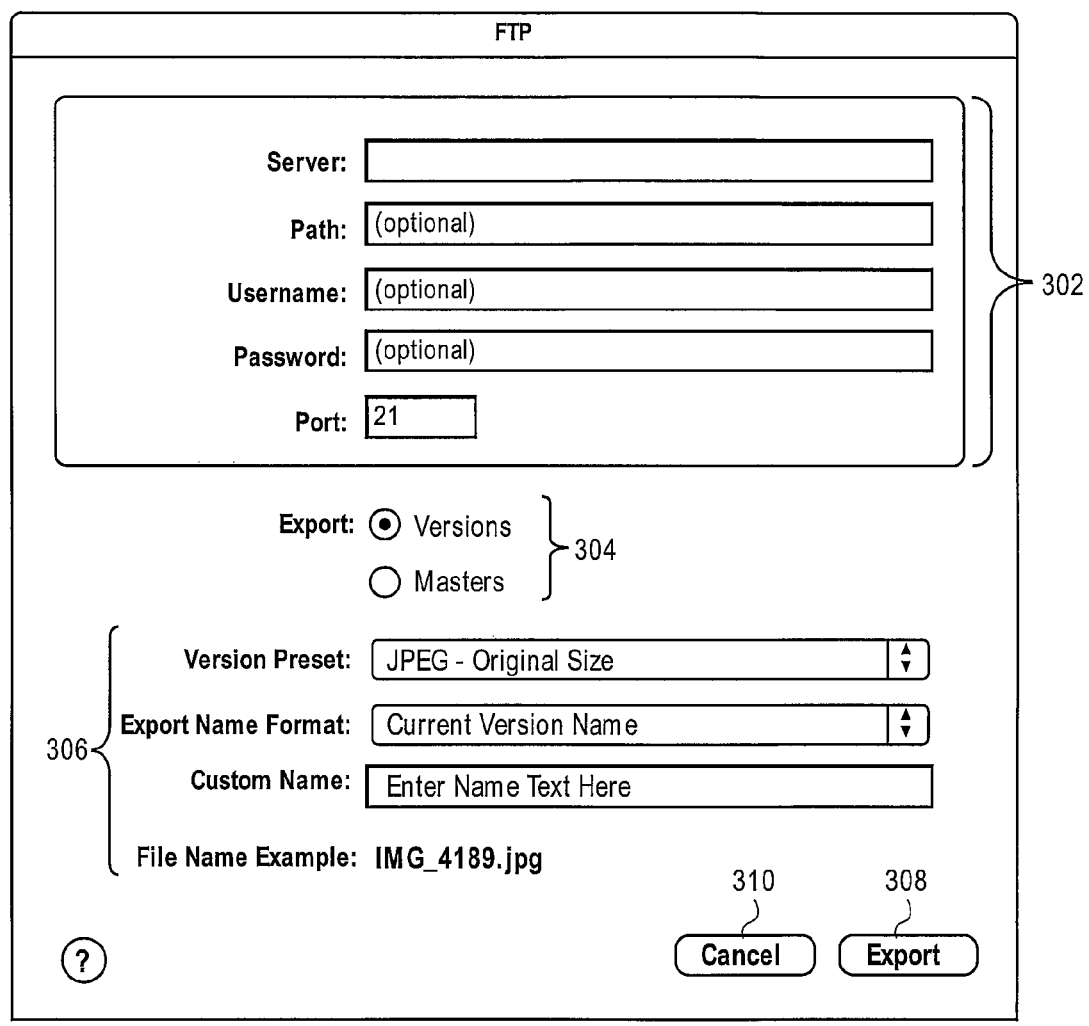
FIG. 3A and FIG. 3B are example plug-in user interfaces.
Figure 3B:
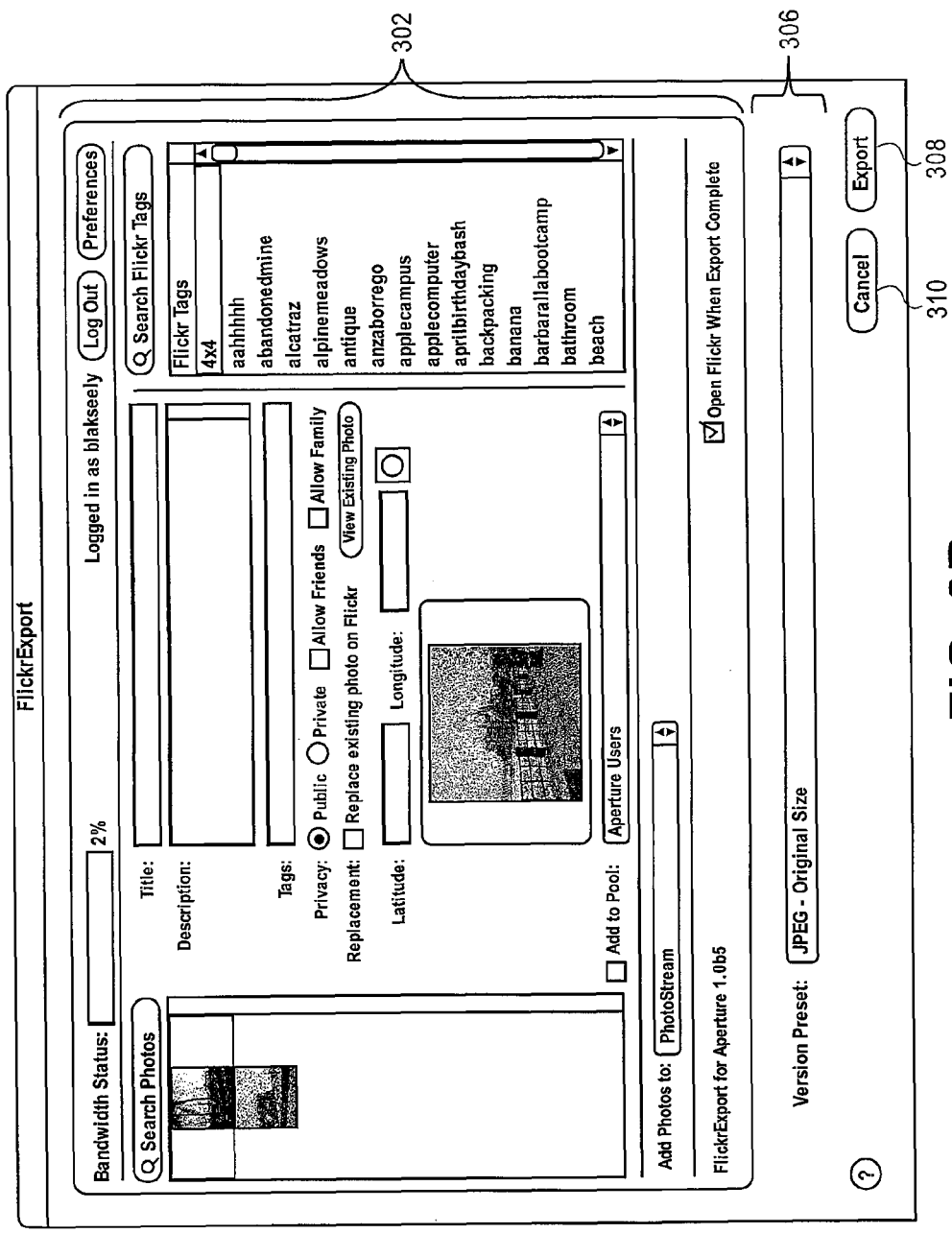

FIG. 3A and FIG. 3B are example plug-in user interfaces. Referring to FIG. 3A, plug-in UI 114A has a plug-in provided region 302, buttons for selecting a version of the image to be exported 304, user provided rendering parameter region 306, export button 308, and cancel button 308. The plug-in provided region 302 is generated by the image editing application 102 based on information provided by the plug-in 104. This region 302 allows the user to enter information that is specific to the plug-in 104. For example, region 302 might allow the user to enter information for storing photographs on a web site. In example plug-in UI 114A, various fields are provided in region 302 for the user to enter information to store images on a server. The configuration of region 302 may vary significantly from one plug-in 104 to the next. FIG. 3B shows an example in which region 302 has a substantially different configuration. Information that the user enters in region 302 does not need to be provided from the plug-in 104 to the image editing application 102.

The plug-in 104 might only allow the user to export the master image 110, or might allow a user to have the choice of exporting either the master image 110 or an adjusted version. By adjusted version, it is meant image adjustments have been applied to the master image 110, by for example, image adjustment instructions 125. In the example plug-in UI 114A of FIG. 3A, the plug-in 104 has informed the image rendering application 102 that the user is allowed to select versions. Therefore, the plug-in UI 114A has buttons 304 that allows the user to select, for export, either the master image 110 or a version of the master image 110 to which image adjustments have been applied.

The user provided rendering parameter region 306 contains means for the user to enter exporting parameters. Recall that exporting parameters are provided from the plug-in 104 to the image editing application 102. The plug-in 104 informs the image editing application 102 as to which exporting parameters the user is allowed to enter. For example, the plug-in might allow the user to specify a file location for the exported image. Therefore, the image editing application 102 generates suitable means for the user to enter these exporting parameters. The example plug-in UI 114A has scroll down windows for entering an image format and size (version preset) and a name format for the export version 130 (export name format). The user can enter a custom name for a file in which the exported image is to be stored in the "custom name" field. The exporting parameters are illustrative. Moreover, the means for entering the exporting parameters are illustrative.

The example plug-in UI 114A has an export button 308, which the user selects to initiate an export of one or more images. The user may cancel the overall process by selecting the cancel button 310.

FIG. 3B depicts another example plug-in UI 114B. In general, plug-in UI 114B has a plug-in provided region 302, user provided rendering parameter region 306, export button 308, and cancel button 308. The plug-in provided region 302 is generated by the image editing application 102 based on information provided by the plug-in 104. Plug-in UI 114B does not have a region for the user to select between versions of the image (see region 304 of FIG. 3A). Note that the plug-in provided region 302 of example plug-in UI 114B is substantially different from the plug-in provided region 302 of example plug-in UI 114A. Moreover, note that plug-in UI 114B does not allow the user to select as many exporting parameters as plug-in UI 114A. It is not a requirement that a plug-in UI 114 allow the user to select any exporting parameters. For example, the plug-in 104 itself might provide all of the exporting parameters to the image editing application 102.

Example Process Flow

As previously discussed, a user edits digital images, such as photographs, with the image editing application 102. At some point, the user decides to perform some other functions such as store the photographs to a website. When the user decides to export one or more digital images, the user selects an appropriate plug-in 104. The image editing application 102 has an interface for selecting among different plug-ins 104, in one embodiment. The image editing application 102 invokes the user-selected plug-in 104. The image editing application 102 may have access to many different plug-ins 104. Plug-ins 104 typically have been installed at some time prior to process 114A. Optionally, the image editing application 102 may determine whether the selected plug-in 104 complies with certain conditions as a pre-condition to installing the plug-in 104.

Figure 4:
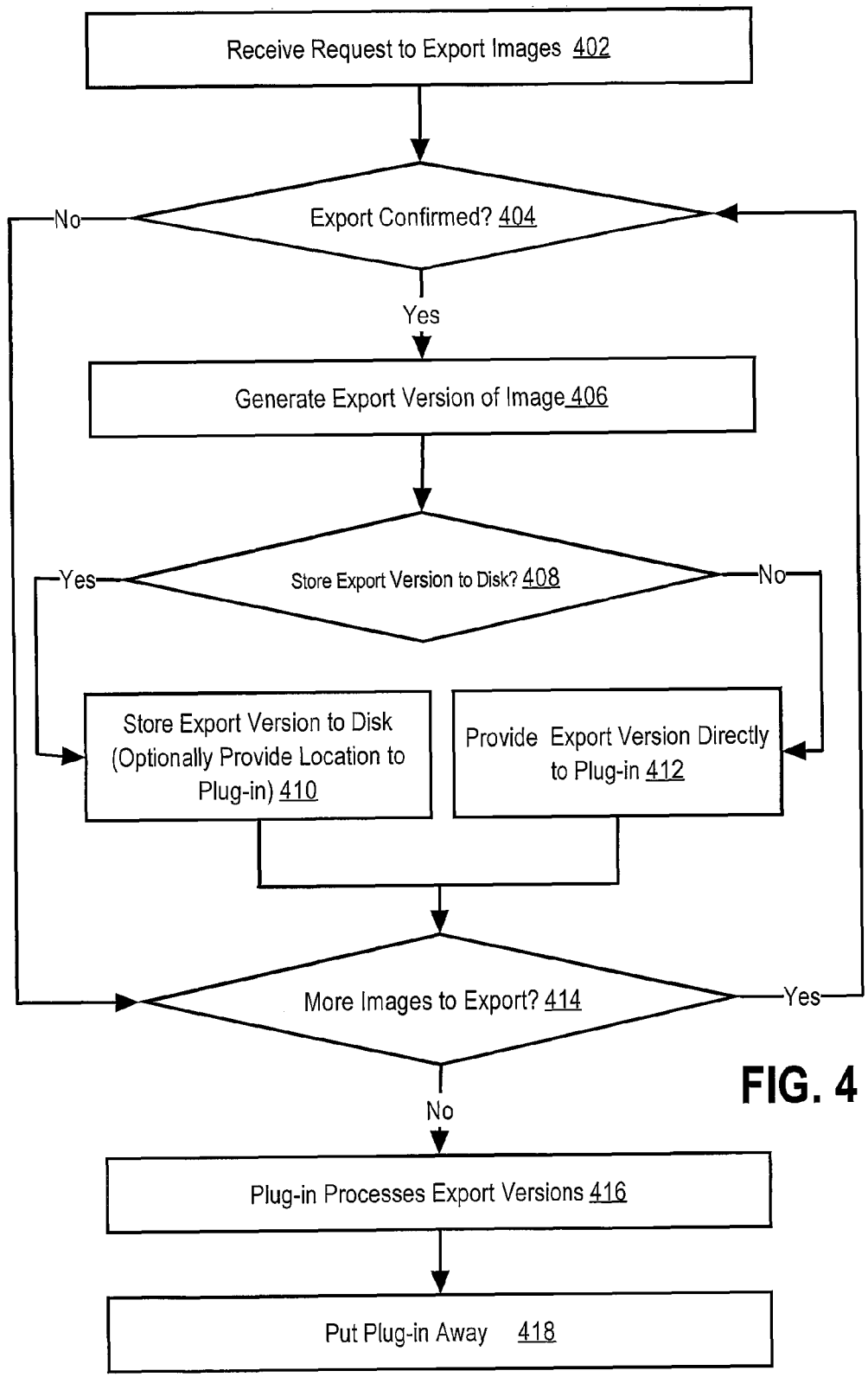
FIG. 4 shows a process of exporting edited images from an image editing application, in accordance with an embodiment of the present invention

The image editing application 102 then generates a plug-in UI 114. Example plug-in UIs 114A, 114B are depicted in FIG. 3A and FIG. 3B. The user may enter various exporting parameters in the user provided rendering parameter region 306. After the user selects the export button 308 in a plug-in UI 114, a series of events happen. Process 400 of FIG. 4 describes what happens in response to the user selecting the export button 308, in accordance with one embodiment.

In step 402, the image editing application 102 receives a request to export one or more images. In one embodiment, the request is caused by a user selecting the export button 308 in a plug-in UI (e.g., 114A, 114B). The image editing application 102 then provides the plug-in 104 with the opportunity to decide which candidate images should be exported. The image editing application 102 performs steps 404 through 414 for each image that is a candidate for export.

In step 404, the image editing application 102 confirms with the plug-in 104 whether the plug-in 104 wishes this candidate image to be exported. Either at this time, or at some prior time, the image editing application 102 provides the plug-in 104 with image metadata regarding each candidate image. This image metadata may include such information as file type for the image, image size (e.g., number of pixels), and any other information. The plug-in 104 uses the image metadata to determine whether the image meets criteria such as file format or number of pixels. If the plug-in 104 confirms that this image should be exported, then control passes to step 406. Otherwise control passes to step 414, where the image editing application 102 determines whether there are any more candidate images for export. If there are more candidate images, then control passes to step 404.

In step 406, the image editing application 102 generates an export version 130 for this candidate image. The export version 130 may be based on the master image 110, as modified by various exporting parameters and image adjustment instructions. Among the possible modifications to the master image 110 include the following. If the plug-in 104 allowed the user to select adjusted versions of the master image 110, and if the user selected adjusted versions, then the image editing application 102 applies image adjustment instructions 125 to the master image 110. However, if the user selected that the master image 110 should be exported, then image adjustment instructions 125 are not applied to the master image 110. Further note that the plug-in 104 may not have provided the user the option of selecting between the master image 110 and adjusted images, in which case a default is used. In one embodiment, the default is to use the master image 110. In another embodiment, the default is to use an adjusted version.

Also in step 406, the image editing application 102 applies any exporting parameters that the user may have provided in the plug-in UI 114, as well as any exporting parameters provided by the plug-in 104 itself. For example, the image editing application 102 generates a JPEG image of x by y pixels, in accordance with exporting parameters that the plug-in 104 controls. In other words, the user may not be allowed to select the image format.

In step 408, the image editing application 102 determines whether the export version 130 should be stored to a storage medium 111. This determination is based on the exporting parameters. For example, the plug-in 104 could request that the image editing application 102 store the export version 130 to the storage medium 111. Alternatively, the plug-in 104 could request that the image editing application 102 provide the export version 130 directly to the plug-in 104.

If the plug-in 104 requested storage of the export version 130, the image editing application 102 stores the export version 130 to the storage medium 111, in step 410. This determination may be based on the exporting parameters. The plug-in 104 may instruct the image editing application 102 where on the storage medium 111 to store the export version 130. The location may be specified in any convenient way. For example, the plug-in 104 might provide a path name, which may be a file system path where the image should be written. Note that the location may have been provided by the user through the plug-in UI 114. For example, the plug-in 104 may or may not allow the user the option to specify the location through the plug-in UI 114. Alternatively, the image editing application 102 may write to a default location, or a location of choice and inform the plug-in 104 as to the file location.

If the plug-in 104 requested direct access of the export version 130, then the image editing application 102 provides such access, in step 412. As an example, the export version 130 may be an object that is provided to the plug-in 104.

In step 414, the image editing application 102 determines whether there are any more candidate images for export. If so, then control passes to step 404. When there are no more candidate images to export, control passes to step 416. In step 416, the image editing application 102 informs the plug-in 104 that the plug-in 104 has received all of the images. The plug-in 104 is then allowed to process the export versions 130. For example, the plug-in 104 uploads the export versions 130 to a web site. After the plug-in 104 is finished, and so informs the image editing application 104, the image editing application 102 puts the plug-in 104 away.

Hardware Overview

Figure 5:
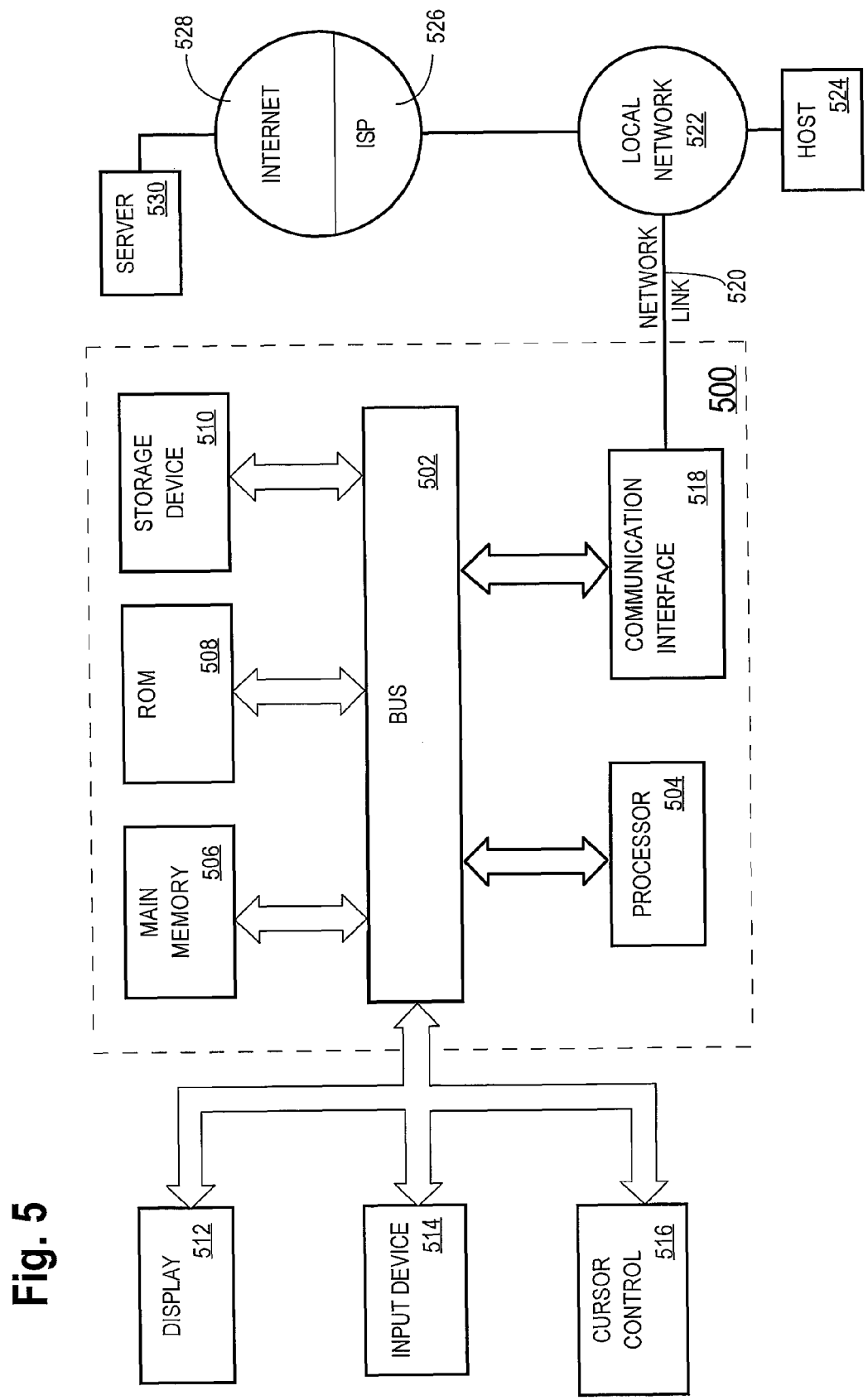
FIG. 5 is a block diagram that illustrates a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX I – Aperture Plug-In Architecture

Appendix I describes an example architecture in accordance with an embodiment of the present invention. However, the present invention is not limited to this example architecture.

ApertureExportPlugIn.h

Introduction

Protocol declaration for implementing an Aperture export plug-in.

Protocols

ApertureExportPlugIn
    Specifies the methods that all Aperture export plug-ins must implement..

Typedefs

ApertureExportProgress

Provides values for UI progress display during export.

```
typedef struct {
    unsigned long currentValue;
    unsigned long totalValue;
    NSString *message;
    BOOL indeterminateProgress;
} ApertureExportProgress;
```

Fields currentValue
	Current progress
totalValue
	Total to do.
message
	Progress message.
indeterminateProgress
	Set to YES to display an indeterminate progress bar.

Discussion
Aperture uses the values in this structure to display the export progress in the UI. Aperture starts calling this method after a plug-in calls -shouldBeginExport and stops calling this method after the plug-in calls -shouldFinishExport or -shouldCancelExport.

***********************************************************************
***********************************************************************

ApertureExportPlugIn

Declared In: ApertureExportPlugIn.h

Introduction
Specifies the methods that all Aperture export plug-ins must implement..

Discussion
Any plug-in that does not implement the entire protocol fails when a user selects the plug-in.

Methods
-allowsMasterExport
	Controls type of export.
-allowsOnlyPlugInPresets
	Controls visibility of presets.
-allowsVersionExport
	Controls type of export.
-defaultDirectory
	Returns starting directory.
-destinationPath
	Returns a valid destination path for writing the file.
-exportManagerDidFinishExport Confirms that Aperture has completed processing all export images.
-exportManagerDidWriteImageDataToRelativePath:forImageAtIndex:
Confirms that Aperture has written an image.
-exportManagerExportTypeDidChange
Alerts plug-in that user has switched type of export.
-exportManagerShouldBeginExport
Alerts plug-in that user has clicked Export button.
-exportManagerShouldCancelExport
Indicates that export should be cancelled.
-exportManagerShouldExportImageAtIndex:
Gives the plug-in the option to selectively export an image.
-exportManagerShouldWriteImageData:toRelativePath:forImageAtIndex:
Provides option for plug-in itself to handle image data.
-exportManagerWillBeginExportToPath:
Indicates the base directory where images will be written.
-exportManagerWillExportImageAtIndex:
Confirms indexed image to be exported.
-firstView
Returns a reference to first item of settingsView.
-initWithAPIManager:
Brokers version management between a plug-in and the host application.
-lastView
Returns a reference to the last item of settingsView.
-lockProgress
Locks ApertureExportProgress structures.
-progress
Displays progress information.
-settingsView
Creates an NSBox for plug-in controls.
-unlockProgress
Alerts plug-in to unlock objects.
-wantsDestinationPathPrompt
Controls user prompt for destination path.
-wantsFileNamingControls
Controls visibility of File Naming Policy options.
-willBeActivated
Called when the user displays a plug-in's export UI, or when the export window becomes the active window.
-willBeDeactivated
Called when a plug-in's export UI is no longer the active view.

allowsMasterExport

Controls type of export.

- (BOOL)allowsMasterExport;

Return Value
Returning YES allows the user to export Master images that contain the original, unmodified camera data in its original format. Returning NO allows only Version export.

allowsOnlyPlugInPresets

Controls visibility of presets.

- (BOOL)allowsOnlyPlugInPresets;

Return Value
If a plug-in includes a file called "Export Presets.plist" in the Resources folder of its bundle and if this file contains valid definitions for one or more export presets, then these presets are included in the user's export preset list when the plug-in is active and when the user is exporting Versions. If the plug-in also returns YES from this method, then only the supplied presets are visible in the list. If the plug-in returns NO from this method, then all the user's existing presets are visible in addition to the plug-in presets. If the plug-in does not provide an "Export Presets.plist" file, or if the file does not contain any valid preset definitions, then the return value of this method has no effect and Aperture displays the users existing list.

allowsVersionExport

Controls type of export.

- (BOOL)allowsVersionExport;

Return Value
Returning YES allows the user to export Version images. (Versions contain all modifications and adjustments to an image and are processed with the options contained in the currently-selected Export Preset.) Returning NO means Aperture only allows the export of Master images.

defaultDirectory

Returns starting directory.

- (NSString *)defaultDirectory;

Return Value
If the user is prompted for a destination path (-wantsDestinationPathPrompt return YES), this method should return the starting directory for the dialog box.

destinationPath

Returns a valid destination path for writing the file.

- (NSString *)destinationPath;

Return Value
A valid destination path when Aperture is writing the file (-exportManagerShouldWriteImageData: returns YES) and when no user prompt is requested (-wantsDestinationPathPrompt returns NO). If nil is returned, and if the plug-in asks Aperture to write image data, it will be written to ~/Pictures/Aperture Exports/.

exportManagerDidFinishExport

Confirms that Aperture has completed processing all export images.

- (void)exportManagerDidFinishExport;

Discussion
Aperture calls this method once if it has completed generating and (optionally) writing data for the export images requested by the plug-in. Aperture assumes that the plug-in is still performing export operations until the plug-in calls either -shouldCancelExport or -shouldFinishExport. NOTE: This method may be called on a secondary thread.

exportManagerDidWriteImageDataToRelativePath:forImageAtIndex:

Confirms that Aperture has written an image.

- (void)exportManagerDidWriteImageDataToRelativePath:(NSString *)path forImageAtIndex:(unsigned)index;

Parameters
path
    The relative path where the object was written.

index
> The index of the specified image.

Discussion
This method is only called if the plug-in returned YES from the -exportManagerShouldWriteImageData: method. NOTE: This method may be called on a secondary thread.

exportManagerExportTypeDidChange

Alerts plug-in that user has switched type of export.

- (void)exportManagerExportTypeDidChange;

Discussion
This method indicates that the user has switched between Master and Version export. The plug-in can use -isMasterExport to ask the export manager for the type of export now being used. Because several version images may be based on a single master, the total count of images, along with the properties for each image, may have changed. The plug-in can use -imageCount to get the new image count before calling any other methods on the export manager.

exportManagerShouldBeginExport

Alerts plug-in that user has clicked Export button.

- (void)exportManagerShouldBeginExport;

Discussion
Aperture calls this plug-in method when the user clicks the Export button. The plug-in should perform any UI validations here. When the plug-in is ready to begin the export process, it should call Aperture's -shouldBeginExport method to begin the export process.

exportManagerShouldCancelExport

Indicates that export should be cancelled.

- (void)exportManagerShouldCancelExport;

Discussion
Indicates that Aperture has encountered an error, or that the user has clicked the Cancel button. Aperture has stopped exporting image data but waits for the plug-in to signal that it is ready to cancel by calling -shouldCancelExport. Aperture then cleans up the export or progress windows.

exportManagerShouldExportImageAtIndex:

Gives the plug-in the option to selectively export an image.

- (BOOL)exportManagerShouldExportImageAtIndex:(unsigned)index;

Parameters
index
    The index of an image.

Return Value
Returning YES causes Aperture to export the image at the specified index. Returning NO does nothing.

Discussion
Aperture generates image data for the specified image, either reading Master data from disk or generating the Version data based on the currently-selected options.

exportManagerShouldWriteImageData:toRelativePath:forImageAtIndex:

Provides option for plug-in itself to handle image data.

- (BOOL)exportManagerShouldWriteImageData:(NSData*)imageData
toRelativePath:(NSString*)path forImageAtIndex:(unsigned)index;

Parameters
imageData
    An object containing all the data for an image and the specified index.
path The relative path where the object should be written. (The base path is set in -exportManagerWillBeginExportToPath:.) The file name is the last component of this parameter.

index

The index for the image. @results Returning YES instructs Aperture to write the image data. Returning NO means the plug-in itself retains the data object and can process the image as appropriate.

Discussion

This method is called every time the plug-in asks Aperture to export and image. NOTE: This method may be called on a secondary thread.

exportManagerWillBeginExportToPath:

Indicates the base directory where images will be written.

- (void)exportManagerWillBeginExportToPath:(NSString *)path;

Parameters path

The base file system path where images will be written.

Discussion

The path designations for each image will be relative to this path. The path is provided by the plug-in or by the user, depending on whether the plug-in asked Aperture to display a destination prompt or not. Because the File Naming Policy controls allow the user to specify a hierarchy of export directories based on image data, other export calls may specify a series of subdirectories. The plug-in should retain a reference to this path in order to build the full destination path.

exportManagerWillExportImageAtIndex:

Confirms indexed image to be exported.

- (void)exportManagerWillExportImageAtIndex:(unsigned)index;

Parameters index

The index of an image.

Discussion
This method confirms the index value that the plug-in returned to -exportManagerShouldExportImageAtIndex:.

--- firstView

---

Returns a reference to first item of settingsView.

- (NSView *)firstView;

Return Value
Returns a reference to the first item in the tab order of settingsView.

--- initWithAPIManager:

---

Brokers version management between a plug-in and the host application.

- (id)initWithAPIManager:(id<PROAPIAccessing>)apiManager;

Parameters
apiManager
    The ProPlug plug-in manager object.

Return Value
An initialized plug-in controller object.

Discussion
The apiManager object is the protocol broker between a plug-in and the host. It ensures that a plug-in supporting a particular version of the API is given the host objects that correspond to this version. A plug-in should call -apiForProtocol on the apiManager object to obtain a reference to the host export manager for use throughout the export process. If the plug-in fails to obtain a reference to the host export manager, it should fail to initialize.

--- lastView

---

Returns a reference to the last item of settingsView.

- (NSView *)lastView;

Return Value
Returns a reference to the last item in the tab order of settingsView.

lockProgress

Locks ApertureExportProgress structures.

- (void)lockProgress;

Discussion
The plug-in should maintain an NSLock or similar object and perform any necessary locking here. Aperture will always call this method from the main thread before calling -progress.

progress

Displays progress information.

- (ApertureExportProgress *)progress;

Return Value
A pointer to a valid ApertureExportProgress structure.

Discussion
Aperture uses the values in this structure to display the progress UI. Aperture begins calling this method after the plug-in calls -shouldBeginExport and stops calling this method after the plug-in calls -shouldFinishExport or -shouldCancelExport.

settingsView

Creates an NSBox for plug-in controls.

- (NSView *)settingsView;

Return Value

The subclass of NSBox that contains all of the plug-ins UI and controls.

Discussion
Aperture currently limits the size of the export window to 1100px wide by 750px tall. If the size of the window plus the settings view is too large, Aperture places the view in the window and then resizes to the maximum. For best results, make sure your settings view can resize if necessary. (This is also useful if future versions of Aperture change the maximum size.) Visually, plug-ins should attempt to separate their controls from the items Aperture provides. Placing plug-in controls inside an NSBox is generally the best way to do this.

unlockProgress

Alerts plug-in to unlock objects.

- (void)unlockProgress;

Discussion
The plug-in should maintain an NSLock or similar object and perform any necessary unlocking here. Aperture will always call this method from the main thread after calling -progress.

wantsDestinationPathPrompt

Controls user prompt for destination path.

- (BOOL)wantsDestinationPathPrompt;

Return Value
If this method returns YES, Aperture prompts the user for a destination path for an exported image or images. If this method returns NO, Aperture assumes a valid path is provided by -destinationPath.

wantsFileNamingControls

Controls visibility of File Naming Policy options.

- (BOOL)wantsFileNamingControls;

Return Value
Returning YES allows the user to use Aperture's File Naming Policy options to specify the file name and folder hierarchy for exported images. Returning NO hides the File Naming Policy controls on the export window. The UI elements affected include the Export Name Format popup menu, the Custom Name field, and the Example Name field.

willBeActivated

Called when the user displays a plug-in's export UI, or when the export window becomes the active window.

- (void)willBeActivated;

willBeDeactivated

Called when a plug-in's export UI is no longer the active view.

- (void)willBeDeactivated;

ApertureExportManager.h

Introduction
Protocol declaration for Aperture's export interface.

Protocols
ApertureExportManager

#defines kExportKeyCustomProperties define kExportKeyCustomProperties @"kExportKeyCustomProperties"

Discussion
An NSDictionary containing all the Custom Metadata key-value pairs for the image.

kExportKeyEXIFProperties define kExportKeyEXIFProperties @"kExportKeyEXIFProperties"

Discussion
An NSDictionary containing the EXIF key-value pairs for the image.

kExportKeyImageSize define kExportKeyImageSize @"kExportKeyImageSize"

Discussion
An NSValue object containing an NSSize with the pixel dimensions of the specified image. For Version images, the pixel dimensions take all cropping, adjustments, and rotations into account. For Master images, the size is the original pixel dimensions of the image.

kExportKeyIPTCProperties define kExportKeyIPTCProperties @"kExportKeyIPTCProperties"

Discussion
An NSDictionary containing all the IPTC key-value pairs for the image.

kExportKeyKeywords define kExportKeyKeywords @"kExportKeyKeywords"

Discussion
An NSArray containing an NSString for each keyword for this image.

kExportKeyMainRating define kExportKeyMainRating @"kExportKeyMainRating"

Discussion
An NSNumber representing the rating for this image.

kExportKeyProjectName define kExportKeyProjectName @"kExportKeyProjectName"

Discussion
An NSString containing the name of the project containing the image.

kExportKeyReferencedMasterPath define kExportKeyReferencedMasterPath @"kExportKeyReferencedMasterPath"

Discussion
An NSString containing the absolute path to the master image file. If the image is not referenced (i.e. the master is inside the Aperture Library bundle), then this value is nil.

kExportKeyThumbnailImage define kExportKeyThumbnailImage @"kExportKeyThumbnailImage"

Discussion
An NSImage object containing a reduced-size JPEG of the specified image. Note that values may be nil for this key for master images, or for versions of unsupported master formats.

kExportKeyUniqueID define kExportKeyUniqueID @"kExportKeyUniqueID"

Discussion
An NSString containing a unique identifier for specified image.

kExportKeyVersionName define kExportKeyVersionName @"kExportKeyVersionName"

Discussion
An NSString containing the version name of the selected image.

kExportKeyXMPString define kExportKeyXMPString @"kExportKeyXMPString"

Discussion
An NSString containing the XMP data for the original master of this image.

*******************************************************************
*******************************************************************

ApertureExportManager

Declared In: ApertureExportManager.h

Introduction

Protocol definition for the Aperture export interface. You use this protocol to communicate with the Aperture application.

Methods

-addCustomMetadataKeyValues:toImageAtIndex:
   Adds custom metadata to a Version image.
-addKeywords:toImageAtIndex:
   Adds keywords to a Version image.
-imageCount
   Returns the number of images the user wants to export.
-isMasterExport
   Indicates whether Aperture is exporting Master or Version images.
-propertiesForImageAtIndex:
   Returns a dictionary containing all the properties for an image.
-selectedExportPresetDictionary
   Returns the key-value pairs defining the currently-selected export presets for a Version export.
-shouldBeginExport
   Tells Aperture to start the export process.
-shouldCancelExport
   Tells Aperture to cancel the export process.
-shouldFinishExport
   Signals that Aperture can deallocate the plug-in.
-window
   Provides reference to frontmost window.

addCustomMetadataKeyValues:toImageAtIndex:

Adds custom metadata to a Version image.

- (void)addCustomMetadataKeyValues:(NSDictionary *)customMetadata toImageAtIndex:(unsigned)index;

Parameters
customMetadata
> An NSDictionary containing NSString key-value pairs representing the custom metadata.

index
> The index of the target image.

Discussion
This method has no effect if called on a Master image.

addKeywords:toImageAtIndex:

Adds keywords to a Version image.

- (void)addKeywords:(NSArray *)keywords toImageAtIndex:(unsigned)index;

Parameters
keywords
> An NSArray of NSString objects representing the keywords to add.

index
> The index of the target image.

Discussion
This method has no effect if called on a Master image.

imageCount

Returns the number of images the user wants to export.

- (unsigned)imageCount;

Return Value
An unsigned integer indicating the number of images the user wants to export.

Discussion
Note that the image count may change if the user is allowed to choose between Master and Version export (see -allowsMasterExport). If the user switches, the Aperture export manager sends the plug-in a message (see -exportManagerExportTypeDidChange). The plug-in should then call -imageCount to make sure the number of images to export is correct.

isMasterExport

Indicates whether Aperture is exporting Master or Version images.

- (BOOL)isMasterExport;

Return Value
Returns YES if Aperture is exporting Master images. Returns NO if Aperture is exporting Version images.

propertiesForImageAtIndex:

Returns a dictionary containing all the properties for an image.

- (NSDictionary *)propertiesForImageAtIndex:(unsigned)index;

Parameters
index
    The index of the target image.

Return Value
A dictionary containing the available properties for the specified image.

Discussion
For Master images, the returned properties come from the original import properties. These include properties from the image file and camera as well as any IPTC values the user added on import. The keys contained in the properties dictionary are defined at the beginning of this header file.

selectedExportPresetDictionary

Returns the key-value pairs defining the currently-selected export presets for a Version export.

- (NSDictionary *)selectedExportPresetDictionary;

Return Value

A pointer to an NSDictionary structure.

Discussion
Returns the key-value pairs defining the currently-selected export presets for a Version export. Returns nil if the user is exporting a Master image.

shouldBeginExport

Tells Aperture to start the export process.

- (void)shouldBeginExport;

Discussion
Calling this method causes Aperture to determine the destination path for export, confirm the images to export, put away the export window, and begin the export process. A plug-in should call this method only in response to -exportManagerShouldBeginExport and after performing any necessary validations, network checks, and so on.

shouldCancelExport

Tells Aperture to cancel the export process.

- (void)shouldCancelExport;

Discussion
The plug-in can call this method at any time to have Aperture put away all export windows, stop the export process, and return the user to the workspace. Additionally, if Aperture calls -exportManagerShouldCancelExport, Aperture then halts all activity and waits for the plug-in to call this method.

shouldFinishExport

Signals that Aperture can deallocate the plug-in.

- (void)shouldFinishExport;

Discussion

When Aperture finishes processing the export image data, it calls -exportManagerDidFinishExport. It continues to ask the plug-in for progress updates until the plug-in calls this method. Once this happens, Aperture closes the export modal window and deallocates the plug-in.

window

Provides reference to frontmost window.

- (id)window;

Return Value
A reference to the current frontmost window.

Discussion
Until the plug-in calls -shouldBeginExport, the reference points to the export window. After the export process begins, the reference points to the progress sheet or to Aperture's main window.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

What is claimed is:

1. One or more non-transitory machine-readable media storing instructions which, when executed by one or more processors, cause:
   determining, by an image editing application, one or more exporting parameters that are not established by a user of the image editing application and that are required to make an export version of a digital image compatible with requirements of an online service to which the export version is to be sent;
   based on the one or more exporting parameters and a master version of the digital image, generating, by the image editing application, an export version of the digital image; and
   causing, by the image editing application, the export version of the digital image to be sent, from a device upon which the image editing application executes, over a network, to the online service that is remote relative to the device.

2. The one or more non-transitory machine-readable media of claim 1, wherein:
   the instructions, when executed by the one or more processors, further cause receiving input that indicates a request to export the digital image;
   determining the one or more exporting parameters is performed in response to receiving the input.

3. The one or more non-transitory machine-readable media of claim 1, wherein the one or more exporting parameters include at least one of an image format of the export version, an image size of the export version, a location at which the export version is to be stored, or image metadata requirements.

4. The one or more non-transitory machine-readable media of claim 1, wherein:
   the one or more exporting parameters are received from a software plug-in component;
   causing the export version of the digital image to be exported to the online service comprises making the export version of the digital image available to the software plug-in component;
   the software plug-in component causes the export version of the digital image to be sent to the online service.

5. The one or more non-transitory machine-readable media of claim 4, wherein the instructions, when executed by one or more processors, further cause:
   causing, by the image editing application, an interface to be displayed, wherein the interface is for selecting a plug-in from among a plurality of plug-ins, wherein the plurality of plug-ins includes the software plug-in; and
   receiving input that indicates a user selection of the software plug-in.

6. The one or more non-transitory machine-readable media of claim 4, wherein the instructions, when executed by the one or more processors, further cause:
   sending, to the software plug-in, image metadata of the digital image, wherein the software plug-in determines, based on the image metadata, whether the digital image should be exported.

7. The one or more non-transitory machine-readable media of claim 1, wherein the instructions, when executed by the one or more processors, further cause:
   prior to generating the export version of the digital image, determining, by the image editing application, to apply one or more image adjustments to the master version of the digital image;
   wherein the one or more image adjustments include at least one of color adjustments, changing contrast, changing brightness, image re-sizing, image cropping, image rotating, noise removal, removal of elements, and red eye removal;
   wherein the export version is also based on the one or more image adjustments.

8. The one or more non-transitory machine-readable media of claim 1, wherein the instructions, when executed by one or more processors, further cause:
   prior to generating the export version of the digital image, generating, by the image editing application, a user interface that allows a user to enter one or more parameters that are used to control the export of the export version of the digital image.

9. The one or more non-transitory machine-readable media of claim 1, wherein:
   generating export version of the digital image is further based on one or more other export parameters; and
   the one or more other export parameters are based on input from a user of the image editing application.

10. One or more non-transitory machine-readable media storing instructions which, when executed by one or more processors, cause:
    sending, by a software plug-in, to an image editing application, one or more exporting parameters;
    after sending the one or more exporting parameters to the image editing application, identifying, by the software plug-in, an export version, of a digital image, wherein the image editing application generated the export version based on the one or more parameters; and
    causing, by the software plug-in, the export version of the digital image to be exported to a second application that is different than the image editing application.

11. The one or more non-transitory machine-readable media of claim 10, wherein:
    prior to identifying the export version, the image editing application stored the export version at a particular location in persistent storage; and
    identifying the export version comprises locating the export version at the particular location in persistent storage.

12. The one or more non-transitory machine-readable media of claim 10, wherein identifying the export version comprises receiving, by the software plug-in, the export version from the image editing application.

13. The one or more non-transitory machine-readable media of claim 10, wherein the image editing application executes on a first device and the second application executes on a second device that is remote relative to the first device.

14. The one or more non-transitory machine-readable media of claim 10, wherein the one or more exporting parameters include at least one of an image format of the export version, an image size of the export version, a location at which the export version is to be stored, or image metadata requirements.

15. The one or more non-transitory machine-readable media of claim 10, wherein the instructions, when executed by the one or more processors, further cause:
   receiving, by the software plug-in, from the image editing application, image metadata about the digital image; and
   determining, by the software plug-in, whether one or more attributes of the digital image satisfy one or more criteria;
   wherein causing the export version to be exported is only performed in response to determining that the one or more attributes of the digital image satisfy the one or more criteria.

16. A method comprising:
   determining, by an image editing application, one or more exporting parameters that are not established by a user of the image editing application and that are required to make an export version of a digital image compatible with requirements of an online service to which the export version is to be sent;
   based on the one or more exporting parameters and a master version of the digital image, generating, by the image editing application, an export version of the digital image; and
   causing, by the image editing application, the export version of the digital image to be sent, from a device upon which the image editing application executes, over a network, to the online service that is remote relative to the device.

17. The method of claim 16, wherein the one or more exporting parameters include at least one of an image format of the export version, an image size of the export version, a location at which the export version is to be stored, or image metadata requirements.

18. The method of claim 16, wherein:
   the one or more exporting parameters are received from a software plug-in component;
   causing the export version of the digital image to be exported to the online service comprises making the export version of the digital image available to the software plug-in component; and
   the software plug-in component causes the export version of the digital image to be sent to the online service.

19. The method claim 18, further comprising:
   causing, by the image editing application, an interface to be displayed, wherein the interface is for selecting a plug-in from among a plurality of plug-ins, wherein the plurality of plug-ins includes the software plug-in; and
   receiving input that indicates a user selection of the software plug-in.

20. The method of claim 16, further comprising:
   prior to generating the export version of the digital image, determining, by the image editing application, to apply one or more image adjustments to the master version of the digital image;
   wherein the one or more image adjustments include at least one of color adjustments, changing contrast, changing brightness, image re-sizing, image cropping, image rotating, noise removal, removal of elements, and red eye removal;
   wherein the export version is also based on the one or more image adjustments.

21. The method of claim 16, further comprising:
   prior to generating the export version of the digital image, generating, by the image editing application, a user interface that allows a user to enter one or more parameters that are used to control the export of the export version of the digital image.

22. The one or more non-transitory machine-readable storage media of claim 1, wherein:
   determining the one or more exporting parameters are performed in response to receiving a request, initiated by a user of the image editing application, to export one or more digital images;
   the digital image is a first candidate image;
   the instructions, when executed by the one or more processors, further cause, without receiving further input from the user of the image editing application:
      determining, by the image editing application, whether there are any other candidate images, other than the first candidate image, for export;
      in response to determining that there is another candidate image for export, the image editing application:
         determining one or more second exporting parameters;
         based on the one or more exporting parameters and a master version of the other candidate image, generating an export version of the other candidate image; and
         causing the export version of the other candidate image to be sent, from the device, over the network, to the online service.

* * * * *